United States Patent [19]

Khanarian et al.

[11] Patent Number: 4,957,655
[45] Date of Patent: Sep. 18, 1990

[54] COPOLYMERIC NONLINEAR OPTICAL MEDIA

[75] Inventors: Garo Khanarian, Berkeley Heights, N.J.; Donald Raskin, New York, N.Y.; Alan Buckley, Berkeley Heights; Gordon W. Calundann, Somerset City; Anthony J. East, Morris City, all of N.J.

[73] Assignee: Hoechst Celanese Corp., Somerville, N.J.

[21] Appl. No.: 296,259

[22] Filed: Jan. 12, 1989

[51] Int. Cl.$^5$ .............................................. C09K 19/52
[52] U.S. Cl. ........................... 252/299.01; 526/250; 526/291; 526/296; 526/310; 526/329.4; 526/329.7; 350/1.1; 252/582; 252/587; 252/589; 252/600
[58] Field of Search ............... 252/299.01, 582, 583, 252/589, 587, 600; 526/344, 310, 291, 250, 296, 329.4, 329.7; 428/1

[56] References Cited

U.S. PATENT DOCUMENTS

| | | | |
|---|---|---|---|
| 4,027,081 | 5/1977 | Turner | 526/329.4 X |
| 4,059,618 | 11/1977 | Blumfield et al. | 526/329.4 |
| 4,431,263 | 2/1984 | Garito | 350/96.34 |
| 4,518,756 | 5/1985 | Yoshida et al. | 526/313 |
| 4,579,915 | 4/1986 | Choe | 525/435 |
| 4,624,872 | 11/1986 | Stuetz | 428/1 |
| 4,694,066 | 9/1987 | DeMartino et al. | 528/373 |
| 4,808,332 | 2/1989 | DeMartino et al. | 526/312 |
| 4,822,865 | 4/1989 | DeMartino et al. | 526/292.2 |
| 4,894,263 | 1/1990 | Dubois et al. | 252/299.01 |

FOREIGN PATENT DOCUMENTS 0293911 12/1988 European Pat. Off.
61-186942 8/1986 Japan.

OTHER PUBLICATIONS

Berkovic, G. et al., J. Opt. Soc. Am. B. 4(6) 945, 1987.

Primary Examiner—John S. Maples
Assistant Examiner—Richard Treanor
Attorney, Agent, or Firm—Depaoli & O'Brien

[57] ABSTRACT

In a preferred embodiment this invention provides a second order nonlinear optical film medium which consists of a thermoplastic copolymer which has a crystallographic molecular alignment, and a net dipolar molecular orientation normal to the film plane. The crystallographic molecular alignment is formed by axial mechanical stressing, and the dipolar molecular orientation is induced by an electric or magnetic field.

Illustrative of an invention polymer is a copolymer of vinylidene fluoride and 4-[N-(10-methacroyloxydecyl)]-4'-nitrostilbene:

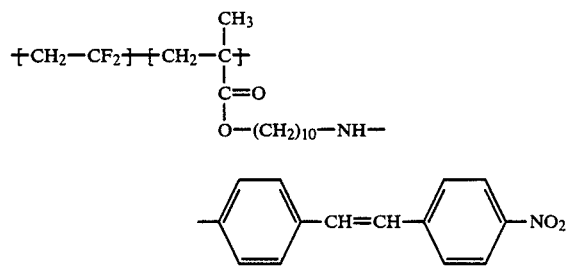

17 Claims, No Drawings

COPOLYMERIC NONLINEAR OPTICAL MEDIA

BACKGROUND OF THE INVENTION

One of the principal advantages of an optical waveguide configuration as contrasted to bulk crystals is that much higher intensity electric fields may be produced by a given applied voltage with the optical waveguide configuration and much lower capacitive values may be realized. Both of these operative characteristics are necessary to achieve high speed operation of such electrooptic modulators.

A thin film waveguide electrooptic modulator can operate employing any of several modulating mechanisms, e.g., Mach-Zehnder interferometry, directional coupling, or rotation of the optical polarization.

For a Mach-Zehnder interferometry type of electrooptical modulator, an optical beam is guided into a linear thin film waveguide and split into two arms, one of which is sandwiched between a pair of electrodes, and subsequently the arms are recombined into a single output beam. A phase shift between the light guided in the two different arms occurs when a voltage is applied to the electrodes and creates a change in the index of refraction in one of the arms due to either the Pockels or Kerr effect. The modulation of the output occurs since the beams in the two arms either add or cancel when they recombine depending on the phase relationship between them. The device requires a single mode linear waveguide for beam splitting and recombination.

For the directional coupling type of modulator, the optical beam is coupled into one of two adjacent linear waveguides and coupled out from the other guide. The amount of optical power which is transferred from one guide to the other guide depends on the index of refraction of the medium between the channels. By applying an electric field and altering the index of refraction between the channels, the power transferred, and hence output from either guide, can be modulated.

The modulating mechanism for the polarization type of modulator is the phase shift between the transverse electric (TE) and transverse magnetic (TM) modes in the same waveguide due to an electric field applied parallel or perpendicular to the surface of the waveguide which creates a directional change in the index of refraction in the waveguide due to a Pockels or Kerr nonlinear optical effect.

For a low voltage operating electrooptic modulator, highly responsive nonlinear optical media are required. $LiNbO_3$ has been an important inorganic species for waveguide electrooptic modulator construction. However, there are certain inherent disadvantages in the use of $LiNbO_3$ or other inorganic compound in an electrooptic modulator, such as the limitation of the input optical power due to the inherent photorefractive effect, and the high fabrication cost for a $LiNbO_3$ high quality crystal.

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, while preserving the electronic interactions responsible for nonlinear optical effects.

Of particular importance for conjugated organic systems is the fact that the origin of the nonlinear effects is the polarization of the r-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D. C. 1983.

Organic nonlinear optical media in the form of transparent thin substrates are described in U.S. Pat. Nos. 4,536,450; 4,605,869; 4,607,095; 4,615, 962; 4,624,872; and references cited therein.

J. Opt. Soc. Am. B, 4, No. 6, 968 (1987) by K. D. Singer et al describes second order orientationally ordered materials, and the relationship between molecular and macroscopic properties. Second harmonic generation measurements were conducted on poled molecule-doped polymer films of Disperse Red 1 azo dye dissolved in poly(methyl methacrylate). Electrooptic properties of poled polymer glasses were determined from the dependence of the optical phase on voltage in a Mach-Zehnder interferometer.

"Nonlinear Optical Properties Of Organic Molecules And Crystals", Volume 1, Chapter 11-1 (Academic Press, 1987), by J. Zyss et al describes a theory of TE and TM propagation in birefringent organic media which are in the form of waveguides.

Also of background interest with respect to the present invention are references which describe polymers exhibiting piezoelectric properties, such as U.S. Pat. Nos. 3,665,206; 3,694,055; 3,878,274; 4,241,128; 4,298,719; 4,356,424; and 4,751,139; incorporated herein by reference.

There is continuing research effort to develop new organic nonlinear optical media and electrooptic devices adapted for laser modulation, information control in optical circuitry, and the like. The potential utility of organic materials with large second order and third order nonlinearities for very high frequency application contrasts with the bandwidth limitations of conventional inorganic electrooptic materials.

Accordingly, it is an object of this invention to provide novel polymers which exhibit a high level of nonlinear optical response.

It is another object of this invention to provide a nonlinear optical film medium consisting of a copolymer of a vinyl halide monomer and a vinyl monomer with a pendant side chain exhibiting second order nonlinear optical susceptibility $\beta$.

It is a further object of this invention to provide an optical light switch or light modulator device with a polymeric nonlinear optical component consisting of a transparent film of a thermoplastic polymer having a crystallographic molecular alignment in the film plane and a net dipolar molecular orientation normal to the film plane.

Other objects and advantages of the present invention shall become apparent from the accompanying description and examples

DESCRIPTION OF THE INVENTION

One or more objects of the present invention are accomplished by the provision of a nonlinear optical medium comprising a transparent thermoplastic polymer film characterized by a crystallographic molecular alignment in the film plane, and a net dipolar molecular orientation normal to the film plane in the film plane, and exhibiting a second order nonlinear optical susceptibility $\chi^{(2)}$ of at least about $1 \times 10^{-8}$ esu as measured at 1.91 μm excitation wavelength.

The crystallographic molecular alignment in the film plane can be achieved by uniaxial or biaxial mechanical stressing or by a magnetic field, and the dipolar molecular orientation can be induced by poling with an electric field, employing procedures described in U.S. Pat. No. 3,694,055 and U.S. Pat. No. 3,878,274.

A present invention copolymer with two modes of molecular orientation exhibits both nonlinear optical and piezoelectric properties.

In another embodiment this invention provides a nonlinear optical medium comprising a transparent thermoplastic polymer film characterized by a crystallographic molecular alignment in the film plane, and a net dipolar molecular orientation normal to the film plane; wherein the polymer is characterized by recurring monomeric units corresponding to the formula:

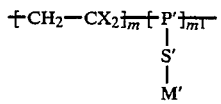

where X is a substituent selected from hydrogen, halogen, cyano, phenyl or halophenyl, and at least one X substituent is halogen or cyano; P' is a polyvinyl main chain unit; S' is a flexible spacer having a linear chain length of between about 1-20 atoms; M' is a pendant group which exhibits second order nonlinear optical susceptibility; m and m¹ are integers which total at least ten, and the m¹ monomer comprises between about 20-80 mole percent of the total m+m¹ monomer units.

In another embodiment this invention provides a nonlinear optical medium comprising a transparent thermoplastic polymer film characterized by a crystallographic molecular alignment, and a net dipolar molecular orientation normal to the film plane, and exhibiting a second order nonlinear optical susceptibility $\chi^{(2)}$ of at least about $1 \times 10^{-8}$ esu as measured at 1.91 μm excitation wavelength; wherein the polymer 5000-200,000, and is characterized by recurring monomeric units corresponding to the formula:

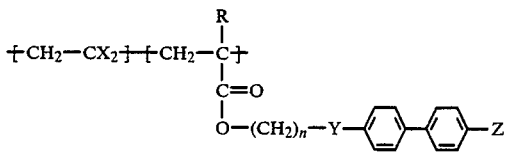

where X is a substituent selected from hydrogen, chloro, fluoro and cyano, and at least one X substituent is halo or cyano; n is an integer with a value between about 2-20; Y is —NR—, —O—, or —S—; R is hydrogen or a $C_1$-$C_4$ alkyl group; and Z is —$NO_2$, —CN or —$CF_3$.

In another embodiment this invention provides a nonlinear optical medium comprising a transparent thermoplastic polymer film characterized by a crystallographic molecular alignment, and a net dipolar molecular orientation normal to the film plane, and exhibiting a second order nonlinear optical susceptibility $\chi^{(2)}$ of at least about $1 \times 10^{-8}$ esu as measured at 1.91 μm excitation wavelength; wherein the polymer 5000-200,000, and is characterized by recurring monomeric units corresponding to the formula:

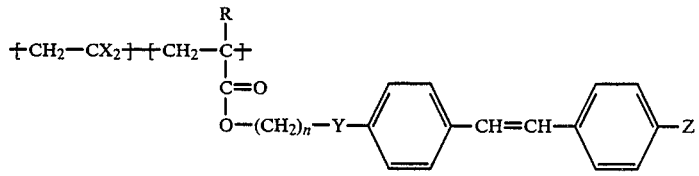

where X is a substituent selected from hydrogen, chloro, fluoro and cyano, and at least one X substituent is halo or cyano; n is an integer with a value between about 2-20; Y is —NR—, —O—, or —S—; R is hydrogen or a $C_1$-$C_4$ alkyl group; and Z is —$NO_2$, —CN or —$CF_3$.

In another embodiment this invention provides an optical light switch or light modulator device with a polymeric nonlinear optical component comprising a transparent film of a thermoplastic polymer characterized by a crystallographic molecular alignment in the film plane, and a net dipolar molecular orientation normal to the film plane, and exhibiting a second order nonlinear optical susceptibility $\chi^{(2)}$ of at least about $1 \times 10^{-8}$ esu as measured at 1.91 μm excitation wavelength.

In a further embodiment this invention provides an electrooptic light switch or light modulator device with a polymeric nonlinear optical component comprising a transparent film of a thermoplastic polymer characterized by a crystallographic molecular alignment induced by mechanical stress or a magnetic field, and a net dipolar molecular orientation normal to the film plane induced by an electric field poling voltage $E_p$; wherein the polymer is characterized by recurring monomeric units corresponding to the formula:

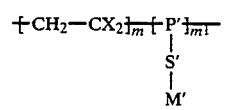

where X is a substituent selected from hydrogen, halogen, cyano, phenyl or halophenyl, and at least one X substituent is halogen or cyano; P' is a polyvinyl main chain unit; S' is a flexible spacer having a linear chain length of between about 1-20 atoms; M' is a pendant group which exhibits second order nonlinear optical susceptibility; m and m¹ are integers which total at least ten, and the m¹ monomer comprises between about 20-80 mole percent of the total m+m¹ monomer units; and wherein the essential relationship between an induced in-plane birefringence Δn and an applied modulating voltage E is represented by the formula:

$$\frac{\Delta n}{E} = \frac{2\pi}{n} f^3 \frac{N\beta\mu E p}{5kT} \times \frac{5}{7} (<P_2> - <P_4>)$$

where $f^3$ is the internal field parameter; N is the number of nonlinear optically active polymer molecules; $\beta$ is the second order nonlinear optical susceptibility; $\mu$ is the dipole moment; k is the Boltzmann constant, T is the temperature; and $<P_2>$ and $<P_4>$ are the second and fourth legendre polynomials characteristic of the average crystallographic molecular alignment of polymer molecules after stretching and poling.

Illustrative of $CH_2=CX_2$ type monomers utilized in the synthesis of the invention copolymers are vinyl chloride, vinyl fluoride, α-fluorostyrene, O-fluorostyrene, vinylidene fluoride, vinylidene chloride, vinylidene chloride fluoride, vinylidene nitrile, and the like.

Illustrative of the P' main chain monomer in the above formulae are acrylate and methacrylate, alkene, vinyl carboxylate, vinyl ether, arylvinyl, and the like.

Illustrative of R $C_1$-$C_4$ substituents in the above formulae are methyl, ethyl, propyl, isopropyl, butyl, isobutyl, and the like.

Illustrative of halogen substituents in the above formulae are chloro, fluoro and bromo atoms.

A present invention copolymer normally has a glass transition temperature in the range between about 40°–180° C., and a weight average molecular weight in the range between about 5000–200,000.

A present invention copolymer has a glass-like appearance which is optically transparent in both solid and melt phases. An invention copolymer is tractable, and the relatively low viscosity of the melt phase facilitates induced orientation of the copolymer side chains by means of an external field.

The term "transparent" as employed herein refers to an optical medium which is transparent or light transmitting with respect to incident fundamental light frequencies and created light frequencies. In a nonlinear optical device, a present invention polymeric nonlinear optical component is transparent to both the incident and exit light frequencies, and the polymeric nonlinear optical component typically exhibits less than about 3 db/cm loss of transmitted incident light.

Illustrative of a present invention optical device containing a polymeric nonlinear optical component as defined above is a laser frequency converter, an optical Pockels effect device, an optical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, or an electrooptic spatial light modulator device.

Optical harmonic generating devices are described in Science, 216(1982); and in U.S. Pat. Nos. 3,234,475; 3,395,329; 3,694,055; 2,858,124; and 4,536,450.

Optical Kerr effect devices are described in U.S. Pat. Nos. 4,428,873 and 4,515,429; and references cited therein.

Degenerate four wave mixing optical devices are discussed by Y. R. Shen in Chapter 15, "The Principles of Nonlinear Optics"; John Wiley & Sons, New York (1984). A nonresonant degenerate four wave mixing mirror device is described by J. Feinberg et al in Optics Letters, 5(12), 519(1980).

An optical interferometric waveguide gate device is described by A. Lattes et al in IEEE J. Quantum Electron, QE-19(11), 1718(1983).

A wide-band electrooptical guided-wave analog-to-digital converter device is described by R. A. Becker et al in Proceedings Of The IEEE, 72(7), 802(1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30(6), 280(1977), and in IEEE Spectrum, June 1981.

Optical parametric devices are described in U.S. Pat. Nos. 3,371,220; 3,530,301; and 3,537,020.

A present invention optical device can be provided by constructing an optical device of the type described in the technical literature, except that a novel molecularly oriented copolymer as defined herein is utilized as the nonlinear optical component.

A present invention second order nonlinear optical film medium is adapted for angle phase matching of transmitted incident and harmonic light waves, or for thermal phase matching on a linear expansion substrate.

A present invention optical thin film can be coated on a piezo-active or magneto-strictive substrate, and controlled stress can be applied to the thin film for modulation of optical properties.

Synthesis Of Invention Copolymers

The preparation of copolymers with a vinyl halide-containing main chain and nonlinear optically responsive side chains is illustrated by the following flow diagram:

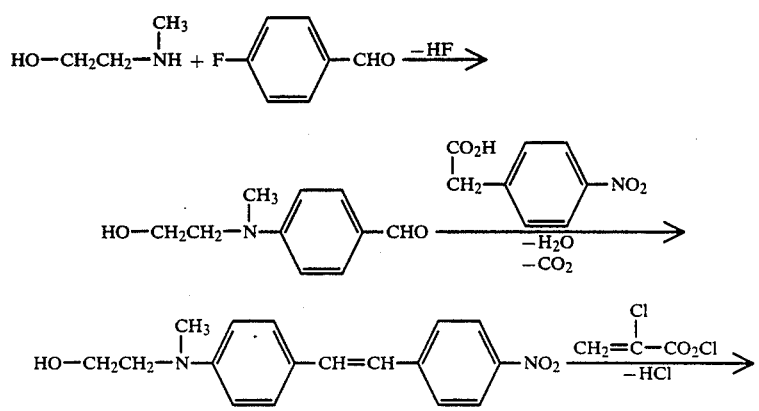

*-continued*

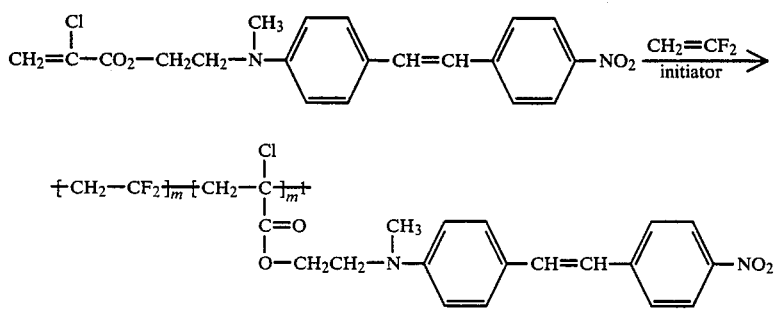

Crystallographic Molecular Alignment

The term "crystallographic" as employed herein refers to the axial alignment of copolymer molecules in a film plane by means of an applied mechanical stress such as by directional stretching of the copolymer film, as described in U.S. Pat. No. 3,665,206.

The applied mechanical stress can be uniaxial, i.e., in a longitudinal or "machine" direction. Superior molecular alignment is achieved by applying a second mechanical stress to the uniaxially stretched film, i.e., the film is stretched in a transverse direction which is perpendicular to the first stretching direction, thereby producing a biaxial alignment of copolymer molecules.

Crystallographic molecular alignment can be achieved also by means of an applied magnetic field, either alone or in combination with mechanical stressing.

External Field-Induced Molecular Orientation

The term "external field" as employed herein refers to an electric field which is applied to a medium of mobile organic molecules, to induce dipolar alignment of the molecules parallel to the field.

The polyvinyl halide units and the nonlinear optically responsive side chains of a present invention copolymer may be aligned by the application of an external field to a mobile matrix of the copolymer molecules. Application of a DC electric field produces orientation by torque due to the interaction of the applied electric field and the net molecular dipole moment of the polymer vinyl halides and side chains. The molecular dipole moment is due to both the permanent dipole moment (i.e., the separation of fixed positive and negative charge) and the induced dipole moment (i.e., the separation of positive and negative charge by the applied field).

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed.

Application of an AC electric external field can produce colinear molecular alignment in which the molecular direction (either parallel or antiparallel to the orientation axis) is statistically random, and the resultant molecularly oriented medium exhibits third order nonlinear optical susceptibility $\chi^{(3)}$. Application of a DC electric external field can produce colinear molecular alignment in which the molecular direction is not random, and is characterized by a net parallel alignment of molecular dipoles. The resultant molecularly oriented medium exhibits second order nonlinear optical susceptibility $\chi^{(2)}$.

The orientation of the copolymer polyvinyl halide and side chain units is accomplished when the polymer molecules are in a mobile phase, e.g., the copolymer is at a temperature near or above the copolymer glass transition temperature. The aligned phase of the mobile molecules can be frozen by cooling the medium below the glass transition temperature while the aligned phase is still under the influence of the applied external field.

Copolymer Nonlinear Optical Properties

The fundamental concepts of nonlinear optics and their relationship to chemical structures can be expressed in terms of dipolar approximation with respect to the polarization induced in an atom or molecule by an external field.

As summarized in the ACS Symposium Series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation with a single molecule. The coefficient a is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in an invention polymer domain:

$$\Delta\mu = \mu_e - \mu_g = \alpha E + \beta EE + \gamma EEE + \quad (1)$$

$$P = P_O + \chi^{(1)}E + \chi^{(2)}EE + \chi^{(3)}EEE + \quad (2)$$

Light waves passing through an array of molecules can interact with them to produce new waves This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave. Birefringent crystals often possess propagation directions in which the refractive index for the fundamental $\omega$ and the second harmonic $2\omega$ are identical so that dispersion may be overcome.

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the dispersion as a function of wavelength, i.e., the optical transmission of fundamental and second harmonic frequencies is phase matched in the medium. The phase matching can provide a high conversion percentage of the incident light to the second harmonic wave.

For the general case of parametric wave mixing, the phase matching condition is expressed by the relationship:

$$n_1\omega_1 + n_2\omega_2 = n_3\omega_3 \text{ ps}$$

where $n_1$ and $n_2$ are the indexes of refraction for the incident fundamental radiation, $n_3$ is the index of refraction for the created radiation, $\omega_1$ and $\omega_3$ are the frequencies of the incident fundamental radiation and $\omega_3$ is the frequency of the created radiation. More particularly, for second harmonic generation, wherein $\omega_1$ and $\omega_3$ are the same frequency $\omega$, and $\omega_3$ is the created second harmonic frequency $2\omega$, the phase matching condition is expressed by the relationship:

$$n_\omega = n_{2\omega}$$

where $n_\omega$ and $n_{2\omega}$ are indexes of refraction for the incident fundamental and created second harmonic light waves, respectively. More detailed theoretical aspects are described in "Quantum Electronics" by A. Yariv, chapters 16–17 (Wiley and Sons, New York, 1975).

A present invention copolymer medium typically has excellent optical transparency and exhibits second harmonic hyperpolarization tensor properties, and the linear electrooptic (Pockels) effect. For second harmonic generation, the bulk phase of the polymer medium whether liquid or solid does not possess a real or orientational average inversion center. The substrate is a macroscopic noncentrosymmetric structure.

Harmonic generation measurements relative to quartz can be performed to establish the value of second order nonlinear susceptibility of optically clear copolymer films.

In the present case of macroscopic nonlinear optical media that are composed of noncentrosymmetric sites on the molecular and domain level, the macroscopic second order nonlinear optical response $\chi^{(2)}$ is comprised of the corresponding molecular nonlinear optical response $\beta$. In the rigid lattice gas approximation, the macroscopic susceptibility $\chi^{(2)}$ is expressed by the following relationship:

$$\chi_{ijk}(-\chi_3;\chi_1,\chi_2) = Nf^{\chi 3}f^{\chi 2}f^{\chi 1} <\beta_{-ijk}(-\chi_3;\chi_1,\chi_2)>$$

wherein N is the number of sites per unit volume, f represent small local field correlations, $\beta_{ijk}$ is averaged over the unit cell, $\omega_3$ is the frequency of the created optical wave, and $\omega_1$ and $\omega_2$ are the frequencies of the incident fundamental optical waves.

A nonlinear optical medium with a centrosymmetric configuration of polymer molecules as defined herein can exhibit third order nonlinear optical susceptibility $\chi^{(3)}$ of at least about $1 \times 10^{-10}$ esu as measured at 1.91 $\mu$m excitation wavelength.

A nonlinear optical medium with an external field-induced noncentrosymmetric configuration of copolymer molecules as defined herein can exhibit second order nonlinear optical susceptibility $\chi^{(2)}$ of at least about $1 \times 10^{-8}$ esu as measured at 1.91 $\mu$m excitation wavelength.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol., Cryst. and Liq Cryst., 106, 219 (1984); incorporated by reference.

Unique Properties Of Invention Optical Media

A present invention optical medium exhibits a novel combination of exceptional physicochemical and optical properties.

The axial molecular alignment by mechanical stressing imparts desirable mechanical properties to an invention copolymer film, such as improved tensile strength and scratch and abrasion resistance.

The polyvinyl halide units in a copolyer main chain contribute piezoelectric properties, and a low level of second order nonlinear optical susceptibility $\beta$.

The pendant side chains of a copolymer exhibits high level of second order nonlinear optical susceptbility $\beta$. The flexibility and mobility of the pendant side chains under external field poling conditions facilitates the orientation of these structural units.

The combination of vinyl halide monomer and pendant side chain monomer provides another particularly important copolymer property. An invention copolymer film is molecularly oriented by external field poling at an elevated temperature, and then the molecular orientation is frozen by cooling of the copolymer while still under the influence of the applied field. It is a unique aspect of a present invention copolymer optical medium that the molecular orientation is stable, and the initial high level of second order nonlinear optical susceptibility $\chi^{(2)}$ is maintained. A present invention copolymer film typically will lose less than about 10 percent of second order nonlinear activity exhibited by the film when the film is maintained at 50° C. for one year.

It appears that the polyvinyl halide main chain units of an invention copolymer tend to accommodate and interlock with the pendant side chains, so as to restrict $\chi^{(2)}$ relaxation of the aligned side chain structures over a time period.

The following examples are further illustrative of the present invention. The components and specific ingredients are presented as being typical, and various modifications can be derived in view of the foregoing disclosure within the scope of the invention.

EXAMPLE I

This Example illustrates the preparation of a 50/50 copolymer of vinylidene fluoride and 4-[N-(2-methacroyloxyethyl)N-methylamino]-4'-nitrostilbene in accordance with the present invention.

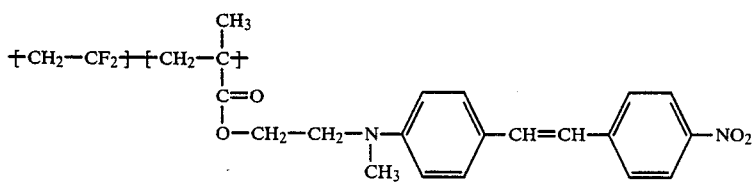

A.
4-[N-(2-Hydroxyethyl)-N-methylamino]benzaldehyde

A 2 liter three necked flask fitted with a mechanical stirrer, thermometer and condenser is charged with 134 g of 2-(methylamino)ethanol, 74.4 g of 4-fluorobenzaldehyde, 1 ml of Aliquat 336, 750 ml of dimethylsulfoxide and 82.8 g of anhydrous potassium carbonate. The mixture is heated at 95° C. for three days The product mixture is cooled and poured into 3 liters of ice water. The resultant solid precipitate is filtered, washed with water, and vacuum dried. The crude product is recrystallized from toluene, m.p. 72° C.

B.
4-[N-(2-Hydroxyethyl)-N-methylamino]-4'-nitrostilbene

A one liter three necked flask fitted with a dropping funnel, mechanical stirrer and condenser is charged with 34.35 g of 4-nitrophenylacetic acid, and piperidine (16.2 g) is added dropwise over a period of 30 minutes. At the end of the addition, a 33.62 g quantity of 4-[N-(2-hydroxyethyl)-N-methylamino]benzaldehyde is added.

The mixture is heated at 100° C. for three hours, and at 130° C. for three hours. After cooling, the resultant semi-solid mass is ground in ethanol in a blender. The particulate solid is filtered, washed, and vacuum dried. The crude product is recrystallized from chlorobenzene, m.p. 185°–187° C.

C. 4-[N-(2-methacroyloxyethyl)-N-methylamino]-4'-nitrostilbene

A 1 liter three necked flask fitted with a thermometer, condenser, dropping funnel with argon inlet and magnetic stirrer is charged with 5 g of 4-[N-(2-hydroxyethyl)-N-methylamino]-4'-nitrostilbene, 5 g of triethylamine and 400 ml of dichloromethane. The mixture is heated to 35° C., and 3.5 g of methacroyl chloride is added dropwise over a 30 minute period. After stirring at 35° C. for 4 hours, another 3.5 g of methacroyl chloride is added and the reaction medium is stirred for about 20 hours at 35° C. The product mixture is extracted three times with distilled water. The organic phase is dried over magnesium sulfate, and the solvent is evaporated The resultant crude product is vacuum dried and then recrystallized from acetonitrile, m.p. 142°–148° C.

D. 50/50 Copolymer

4-[N-(2-Methacroyloxyethyl)-N-methylamino]-4'-nitrostilbene (2 g) is suspended in 20 ml of chlorobenzene in a reactor, and the mixture is degassed one hour. To the suspension are added 0.35 g of vinylidene fluoride (3.5 ml of a 10% solution in chlorobenzene) and one mole percent of azobisisobutyronitrile.

The reactor is capped and placed in a 75° C. oil bath for a period of about 18 hours. The product mixture then is poured into methanol to precipitate the copolymer. The solid copolymer is recovered by filtration, and vacuum dried.

The copolymer has a weight average molecular weight in the range of 60,000–80,000, and exhibits a $T_g$ of 95° C.

EXAMPLE II

This Example illustrated the preparation of copolymers and terpolymers in accordance with the present invention.

The procedures of Example I are followed, employing selected combinations of monomers:

A 25/75 copolymer of 4- [N-(2-methacroyloxyethyl)-N-methylamino]-4'-nitrostilbene and vinylidene fluoride has a weight average molecular weight in the range of 60,000–80,000.

A 25/75 copolymer of 4-[N-(2-methacroyloxyethyl)-N-methylamino]-4'-nitrostilbene and vinylidene chloride has a weight average molecular weight in the range of 60,000–80,000.

Utilizing the Example I procedures, the following copolymers and terpolymers are prepared:

| | |
|---|---|
| (50/50) | 4-[N-[3-(2-chloro)acroyloxypropyl]amino]-4'-cyanostilbene/vinylidene nitrile |
| (90/10) | 4-[N-[8-(2-phenyl)acroyloxyoctyl]-N-ethylamino]-4'-nitrostilbene/vinylidene chloride |
| (30/70) | 4-[N-[2-(2-trifluoromethyl)acroyloxyethyl]-N-methylamino]-4'-nitrostilbene/vinylidene chloride fluoride |
| (50/50) | 4-[N-(2-methacroyloxyethyl)-N-methylamino]-4'-nitrostilbene/vinyl chloride |
| (75/25/25) | 4-[N-(4-acroyloxybutyl)-N-butylamino]-4'-nitrostilbene/vinyl fluoride/o-fluorostyrene |
| (80/20) | 4-(6-Methacryloxyhexyloxy)-4'-biphenyl/vinylidene fluoride |

The prepared polymers have a combination of physical and optical properties which are similar to those of the copolymer described in Example I.

EXAMPLE III

This Example illustrates the preparation of a nonlinear optical medium in accordance with the present invention.

A copolymer in accordance with Example I is melt-pressed at a temperature of 150° C. under a pressure of 100kg/cm² to a sheet 0.5 mm in thickness.

A sample of the polymer sheet is stretched in a tension tester at a tensile rate of 10 mm/min and a temperature of 70° C. to four times its original length. A specimen of the monoaxially stretched sheet then is stretched at a tensile rate of 10 mm/min, in a direction perpendicular to the first stretching direction, to six times the original sheet width.

The biaxially stretched polymer film has a thickness of about 20 microns. The two surfaces of the polymer film are vacuum-coated by aluminum vaporization to form two transparent electrode coatings. Leads from a direct current voltage source are attached to the electrodes.

The electrode-coated film is heated to 85° C., and an electric field strength of $8 \times 10^5$ V/cm is applied across the film for a period of about 20 minutes to induce dipolar molecular orientation parallel to the field. The film then is cooled to room temperature while maintaining the applied voltage. The film exhibits piezoelectric properties. The birefringent index $\Delta n$ at a field strength of 500 volts is about $10 \times 10^{-3}$. The film exhibits a second order nonlinear susceptibility $\chi^{(2)}$ of about $1.5 \times 10^{-8}$ esu as measured at 1.91 μm excitation wavelength.

The film has properties suitable for application as a polymeric nonlinear optical component in an optical device such as a spatial light modulator or a tunable light filter.

What is claimed is:

1. A nonlinear optical medium comprising a transparent thermoplastic polymer film characterized by a crystallographic molecular alignment in the film plane, and a net dipolar molecular orientation normal to the film plane; wherein the polymer is characterized by recurring monomeric units corresponding to the formula:

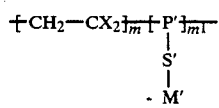

where X is a substituent selected from hydrogen, halogen, cyano, phenyl or halophenyl, and at least one X substituent is halogen or cyano; P' is a polyvinyl main chain unit; S' is a flexible spacer having a linear chain length of between about 1-20 atoms; M' is a pendant group which exhibits second order nonlinear optical susceptibility; m and m¹ are integers which total at least ten, and the m¹ monomer comprises between about 20-80 mole percent of the total m+m¹ monomer units.

2. A nonlinear optical medium in accordance with claim 1 which exhibits a second order nonlinear optical susceptibility $\chi^{(2)}$ of at least about $1 \times 10^{-8}$ esu as measured at 1.91 μm excitation wavelength.

3. A nonlinear optical medium comprising a transparent thermoplastic polymer film characterized by a crystallographic molecular alignment, and a net dipolar molecular orientation normal to the film plane, and exhibiting a second order nonlinear optical susceptibility $\chi^{(2)}$ of at least about $1 \times 10^{-8}$ esu as measured at 1.91 μm excitation wavelength; wherein the polymer has a weight average molecular weight between about 5000-200,000, and is characterized by recurring monomeric units corresponding to the formula:

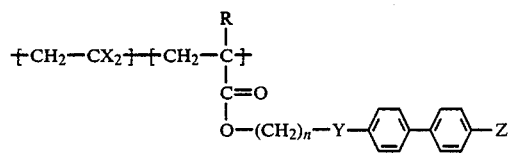

where X is a substituent selected from hydrogen, chloro, fluoro and cyano, and at least one X substituent is halo or cyano; n is an integer with a value between about 2-20; Y is —NR—, —O—, or S; R is hydrogen or a $C_1$-$C_4$ alkyl group; and Z is —$NO_2$, —CN or —$CF_3$.

4. A nonlinear optical medium comprising a transparent thermoplastic polymer film characterized by a crystallographic molecular alignment, and a net dipolar molecular orientation normal to the film plane, and exhibiting a second order nonlinear optical susceptibility $\chi^{(2)}$ of at least about $1 \times 10^{-8}$ esu as measured at 1.91 μm excitation wavelength; wherein the polymer has a weight average molecular weight between about 5000-200,000, and is characterized by recurring monomeric units corresponding to the formula:

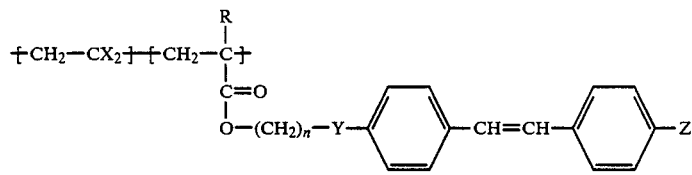

where X is a substituent selected from hydrogen, chloro, fluoro and cyano, and at least one X substituent is halo or cyano; n is an integer with a value between about 2-20; Y is —NR—, —O—, or S; R is hydrogen or a $C_1$-$C_4$ alkyl group; and Z is —$NO_2$, —CN or —$CF_3$.

5. In an electrooptic light switch or light modulator device with a side chain polymeric nonlinear optical component the improvement which comprises a nonlinear optical transparent film of a thermoplastic polymer characterized by a crystallographic molecular alignment induced by mechanical stress or a magnetic field, and a net dipolar molecular orientation of nonlinear optically responsive pendant side chains normal to the film plane induced by an electric field poling voltage $E_p$; wherein the polymer is characterized by recurring monomeric units corresponding to the formula:

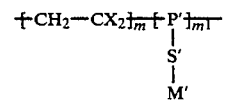

where X is a substituent selected from hydrogen, halogen, cyano, phenyl or halophenyl, and at least one X substituent is halogen or cyano; P' is a polyvinyl main chain unit; S' is a flexible spacer having a linear chain length of between about 1-20 atoms; M' is a pendant group which exhibits second order nonlinear optical susceptibility; m and m¹ are integers which total at least ten, and the m¹ monomer comprises between about 20-80 mole percent of the total m+m¹ monomer units; and wherein the essential relationship between an induced in-plane birefrigence $\Delta n$ and an applied modulating voltage E is represented by the formula:

$$\frac{\Delta n}{E} = \frac{2\pi}{n} f^3 \frac{N\beta\mu E p}{5 kT} \times \frac{5}{7} (<P_2> - <P_4>)$$

where $f^3$ is the internal field parameter; N is the number of nonlinear optically active polymer molecules; $\beta$ is the second order nonlinear optical susceptibility; $\mu$ is the dipole moment; k is the Boltzmann constant; T is the temperature; $<P_2>$ and $<P_4>$ are the second and fourth legendre polynomials characteristic of the average crystallographic molecular alignment of polymer molecules after stretching and poling.

6. In an optical light switch or light modulator device with a side chain polymeric nonlinear optical component the improvement which comprises a nonlinear optical transparent film of a copolymer which is characterized by a crystallographic molecular alignment in the film plane, and a net dipolar molecular orientation of nonlinear optically responsive pendant side chains normal to the film plane, and exhibiting a second order nonlinear optical susceptibility $\chi^{(2)}$ of at least about $1 \times 10^{-8}$ esu as measured at 1.91 $\mu$m excitation wavelength; wherein the polymer has a weight average molecular weight between about 5000–200,000, and is characterized by recurring monomeric units corresponding to the formula:

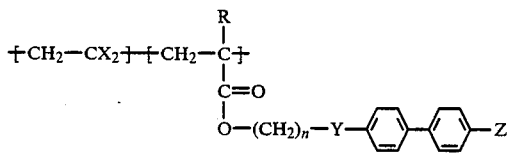

where X is a substituent selected from hydrogen, chloro, fluoro and cyano, and at least one X substituent is halo or cyano; n is an integer with a value between about 2-20; Y is —NR—, —O—, or —S—; R is hydrogen or a $C_1$-$C_4$ alkyl group; and Z is —NO$_2$ —CN or —CF$_3$.

7. A device in accordance with claim 6 wherein in the copolymer formula X is fluoro; R is hydrogen or methyl; Y is —NH—; and Z i nitro.

8. A device in accordance with claim 6 which is an electrooptic spatial light modulator.

9. A device in accordance with claim 6 which is a birefringent waveguide exhibiting second order nonlinear optical response.

10. In an optical light switch or light modulator device with a side chain polymeric nonlinear optical component the improvement which comprises a nonlinear optical transparent film of a copolymer which is characterized by a crystallographic molecular alignment, and a net dipolar molecular orientation of nonlinear optically responsive pendant side chains normal to the film plane, and exhibiting a second order nonlinear optical susceptibility $\chi^{(2)}$ of at least about $1 \times 10^{-8}$ esu as measured at 1.91 $\mu$m excitation wavelength; wherein the polymer has a weight average molecular weight between about 5000–200,000, and is characterized by recurring monomeric units corresponding to the formula:

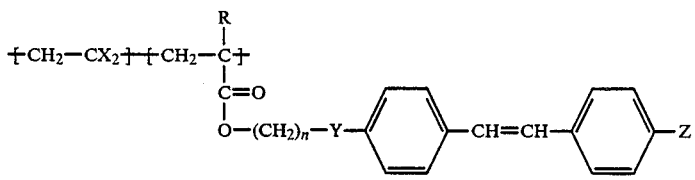

where X is a substituent selected from hydrogen, chloro, fluoro and cyano, and at least one X substituent is halo or cyano; n is an integer with a value between about 2-20; Y is —NR—, —O—, or —S—; R is hydrogen or a $C_1$-$C_4$ alkyl group; and Z is —NO$_2$, —CN or —CF$_3$.

11. A device in accordance with claim 10 wherein in the copolymer formula X is fluoro; R is hydrogen or methyl; Y is —NH—; and Z is nitro.

12. A device in accordance with claim 10 which is an electrooptic spatial light modulator.

13. A device in accordance with claim 10 which is a birefringent waveguide exhibiting second order nonlinear optical response.

14. A copolymer which is characterized by recurring monomeric units corresponding to the formula:

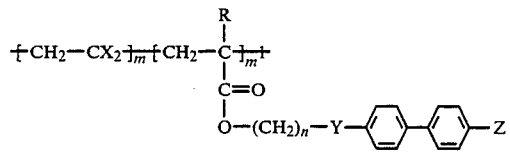

where X is a substituent selected from hydrogen, chloro, fluoro and cyano, and at least one X substituent is halo or cyano; n is an integer with a value between about 2-20; Y is —NR—, —O—, or —S—; R is hydrogen or a $C_1$-$C_4$ alkyl group; Z is —NO$_2$, —CN or —CF$_3$; m and $m^1$ are integers which total at least ten, and the $m^1$ monomer comprises between about 20-80 mole percent of the total m+$m^1$ monomer units.

15. A copolymer in accordance with claim 14 which has a weight average molecular weight between about 5000–200,000.

16. A copolymer which is characterized by recurring monomeric units corresponding to the formula:

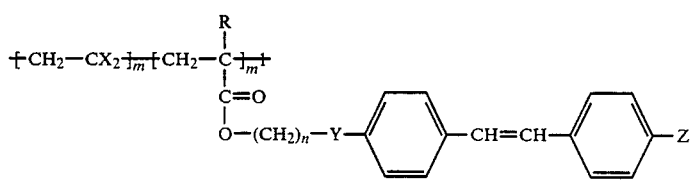

where X is a substituent selected from hydrogen, chloro, fluoro and cyano, and at least one X substituent is halo or cyano; n is an integer with a value between about 2–20; Y is —NR—, —O—, or —S—; R is hydrogen or a $C_1$–$C_4$ alkyl group; Z is —$NO_2$, —CN or —$CF_3$; m and $m^1$ are integers which total at least 10, and the $m^1$ monomer comprises between about 20–80 mole percent of the total m+$m^1$ monomer units.

17. A copolymer in accordance with claim 16 which has a weight average molecular weight between about 5000–200,000.

* * * * *